(12) United States Patent
Sawada et al.

(10) Patent No.: US 11,169,492 B2
(45) Date of Patent: Nov. 9, 2021

(54) CONTROL SYSTEM, AND CONTROL METHOD

(71) Applicant: OMRON Corporation, Kyoto (JP)

(72) Inventors: Shigenori Sawada, Takatsuki (JP); Yasuo Muneta, Kusatsu (JP)

(73) Assignee: OMRON Corporation, Kyoto (JP)

( * ) Notice: Subject to any disclaimer, the term of this patent is extended or adjusted under 35 U.S.C. 154(b) by 222 days.

(21) Appl. No.: 16/621,689

(22) PCT Filed: Jul. 3, 2018

(86) PCT No.: PCT/JP2018/025185
§ 371 (c)(1),
(2) Date: Dec. 11, 2019

(87) PCT Pub. No.: WO2019/009282
PCT Pub. Date: Jan. 10, 2019

(65) Prior Publication Data
US 2020/0192302 A1    Jun. 18, 2020

(30) Foreign Application Priority Data

Jul. 7, 2017 (JP) .............................. JP2017-133765

(51) Int. Cl.
*G05B 9/03* (2006.01)
(52) U.S. Cl.
CPC ...................... *G05B 9/03* (2013.01)
(58) Field of Classification Search
None
See application file for complete search history.

(56) References Cited

U.S. PATENT DOCUMENTS

2002/0040452 A1    4/2002  Birk et al.
2010/0306511 A1*   12/2010 Mochizuki ............ H04L 12/413
                                                712/225
(Continued)

FOREIGN PATENT DOCUMENTS

EP    2224642    9/2010
JP    2011035664 2/2011
(Continued)

OTHER PUBLICATIONS

Lei Wang et al., "The Real-Time Networked Data Gathering Systems Based on EtherCAT", 2009 International Conference on Environmental Science and Information Application Technology, Jul. 4, 2009, pp. 513-515.
(Continued)

*Primary Examiner* — Carlos R Ortiz Rodriguez
(74) *Attorney, Agent, or Firm* — JCIPRNET

(57) ABSTRACT

This control system is provided with a plurality of slave devices and controllers. The controller is connected to one end of a field bus which includes the plurality of slave devices that is linearly connected, and the controller is connected to the other end of the field bus through a communication cable. The controllers are provided with a CPU and a transception part. One of the controllers generates a control frame with the CPU and transmits this from the transception part, and the other of the controllers performs a loop communication of the control frame by the transception part.

15 Claims, 17 Drawing Sheets

(56) References Cited

U.S. PATENT DOCUMENTS

| | | | |
|---|---|---|---|
| 2011/0205886 A1* | 8/2011 | Maruyama | H04L 12/40176 370/225 |
| 2015/0110126 A1* | 4/2015 | Edmiston | H04L 45/66 370/413 |
| 2017/0242693 A1* | 8/2017 | Izaki | G06F 13/00 |

FOREIGN PATENT DOCUMENTS

| | | |
|---|---|---|
| JP | 2012194662 | 10/2012 |
| JP | 2016099634 | 5/2016 |

OTHER PUBLICATIONS

"Search Report of Europe Counterpart Application", dated Mar. 3, 2021, p. 1-p. 10.
"International Search Report (Form PCT/ISA/210) of PCT/JP2018/025185," dated Sep. 4, 2018, with English translation thereof, pp. 1-3.
"Written Opinion (Form PCT/ISA/237) of PCT/JP2018/025185", dated Sep. 4, 2018, with English translation thereof, pp. 1-8.

* cited by examiner

CONTROL SYSTEM, AND CONTROL METHOD

CROSS-REFERENCE TO RELATED APPLICATION

This application is a 371 application of the International PCT application serial no. PCT/JP2018/025185, filed on Jul. 3, 2018, which claims the priority benefit of Japan Patent Application No. 2017-133765, filed on Jul. 7, 2017. The entirety of each of the above-mentioned patent applications is hereby incorporated by reference herein and made a part of this specification.

TECHNICAL FIELD

The present invention relates to a control system including a controller and a slave device.

BACKGROUND ART

At present, many factory automation (FA) systems are in practical use. An FA system includes a controller and a plurality of slave devices. The plurality of slave devices includes a measuring instrument, a switch, a control driver and the like, and control target equipment is connected to the control driver. The controller transmits control data to the plurality of slave devices. In addition, the controller receives measurement data and the like from the plurality of slave devices to generate control data in the next control cycle.

The controller and the plurality of slave devices are connected to each other through, for example, a communication cable or the like as disclosed in Patent Literature 1 (Japanese Patent Application Laid-Open No. 2011-35664), and communicate the above-described data according to a network standard of Ethernet (registered trademark) or EtherCAT (registered trademark).

SUMMARY OF INVENTION

However, in a configuration of the related art, control for a plurality of slave devices is stopped when a controller fails. In addition, when firmware of the controller is rewritten, or the like, the controller is temporarily stopped. Also in this case, control for a plurality of slave devices is stopped.

Thereby, it is not possible to cause each piece of equipment of the FA system to perform a desired operation, which results in, for example, the generation of defective products manufactured in the FA system. In addition, when all equipment of which the operation is controlled by the controller is stopped in association with the stopping of the controller, productivity deteriorates.

Therefore, an objective of the present invention is to provide a control technique capable of continuing control for slave devices even when a controller having performed control for the slave devices is stopped.

A control system includes a field bus to which slave devices are linearly connected through a communication cable, a first controller, and a second controller. The first controller is connected to one end of the field bus, and the second controller is connected to the other end of the field bus.

Each of the first controller and the second controller includes a control frame generation part and a transception part. The control frame generation part generates a control frame to be provided to the slave devices. The transception part transmits and receives the control frame to and from the slave devices.

One of the first controller and the second controller generates the control frame by the control frame generation part, transmits the generated control frame from the transception part, and the other one performs loopback communication of the control frame by the transception part.

In this configuration, the first controller and the second controller have a configuration in which a control frame can be provided to the slave devices. In addition, the first controller and the second controller also have a configuration in which a control frame can be simply looped back. Therefore, even when the first controller cannot generate and transmit a control frame, the second controller generates and transmits the control frame. In contrast, even when the second controller cannot generate and transmit a control frame, the first controller generates and transmits the control frame.

In addition, the control system includes a data communication network that connects the first controller and the second controller without going through the slave devices.

Therefore, the first controller and the second controller directly confirm mutual operation conditions through the data communication network.

Further, in the control system, when the first controller generates and transmits the control frame and the second controller performs loopback communication of the control frame, the following processing is executed. The second controller transmits an operation confirmation signal to the first controller through the data communication network. The second controller starts generation and transmission of the control frame when a response signal to the operation confirmation signal is not able to be received.

Therefore, the second controller easily and reliably confirms that the first controller generates and transmits a control frame and cannot generate and transmit the control frame due to some reasons.

Further, in the control system, the second controller observes the control frame and may start generation and transmission of the control frame when the control frame is not able to be received over a predetermined period of time.

In this configuration, the second controller confirms that the first controller has stopped generation and transmission of a control frame inclusive of information received from a network to which the plurality of slave devices is connected.

In addition, the control system includes a user interface device which is connected to the data communication network and receives an operation input of switching of control between the first controller and the second controller. When the first controller generates and transmits the control frame and the second controller performs loopback communication of the control frame, the first controller stops generation and transmission of the control frame and starts the loopback communication of the control frame when receiving a command for the switching of the control from the user interface device, and the second controller may stop the loopback communication of the control frame and start the generation and the transmission of the control frame when receiving a command for the switching of the control from the user interface device.

In this configuration, generation and transmission of a control frame are switched from the first controller to the second controller in response to an operation input.

Further, in the control system, the first controller and the second controller transmit and receive a switching confirmation signal and mutually confirm the switching. After this configuration, the first controller stops the generation and the transmission of the control frame and starts the loopback communication of the control frame, and the second controller may stop the loopback communication of the control frame and start the generation and the transmission of the control frame.

In this configuration, a timing when the first controller stops generation and transmission of a control frame and a timing when the second controller starts generation and transmission of a control frame are properly adjusted.

Further, in the control system, the control frame generation part and the transception part may be formed of different semiconductor devices.

In this configuration, the above-described switching is reliably realized.

Further, in the control system, the control frame generation part is constituted by a computation element that executes a generation program for the control frame, and the transception part may be constituted by a semiconductor element that exclusively performs transmission and reception of the control frame.

In this configuration, the control frame generation part and the transception part are realized by elements appropriate for the respective processes.

According to the invention, it is possible to continue control for slave devices even when a controller having performed control on the slave devices is stopped.

DESCRIPTION OF EMBODIMENTS

A control system and a control method according to an embodiment of the present invention will be described with reference to the accompanying drawings. In the present embodiment, description will be given using a factory automation (FA) system as an example of a control system, specifically, an FA system having a control network according to EtherCAT (registered trademark) as an example of a network standard. However, a configuration of the present invention can also be applied to other control systems that execute communication according to the same network standard as EtherCAT.

Figure 1:
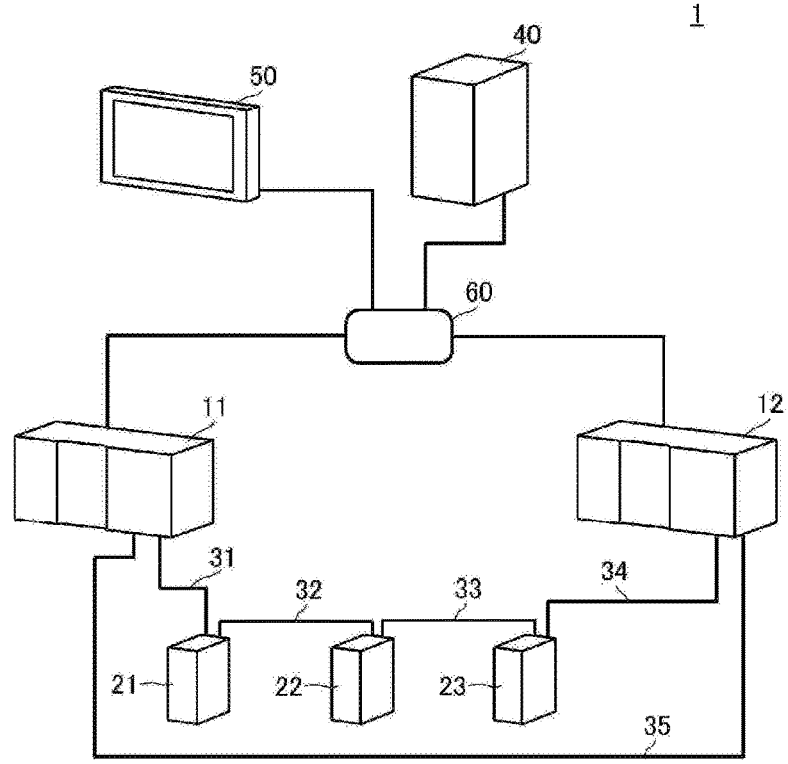
FIG. 1 is a diagram showing a configuration of a device in a control system.

(Configuration of Control System) FIG. 1 is a diagram showing a configuration of a device in a control system. As shown in FIG. 1, a control system 1 includes a controller 11, a controller 12, a plurality of slave devices 21, 22, and 23, a plurality of communication cables 31, 32, 33, 34, and 35, a database device 40, a user interface device (UI device) 50, and an information communication network 60. The controller 11 corresponds to a "first controller" of the present invention, and the controller 12 corresponds to a "second controller" of the present invention.

The database device 40 stores a control frame and a diagnosis frame that are described below. In addition, the database device 40 executes a process related to abnormality detection of a control network using the control frame or the diagnosis frame which are acquired and stored by the control system 1. For example, the process related to abnormality detection which is executed by the database device 40 includes at least one of abnormality diagnosis, abnormality notification, abnormality sign estimation, data trace, and load monitoring of a control network, and can be realized by a known method.

The UI device 50 transmits a user program to the controller 11 and the controller 12. Meanwhile, it is also possible to create a user program in the UI device 50. In addition, the UI device 50 sets a control value and a process for the controller 11 and the controller 12.

The controller 11 is connected to the slave device 21 through the communication cable 31. The slave device 21 is connected to the slave device 22 through the communication cable 32. The slave device 22 is connected to the slave device 23 through the communication cable 33. The slave device 23 is connected to the controller 12 through the communication cable 34.

That is, the controller 11, the slave device 21, the slave device 22, the slave device 23, and the controller 12 are linearly connected in this order. In other words, the plurality of slave devices 21, 22, and 23 is connected in order from a first end to a second end with the controller 11 as the first end and the controller 12 as the second end. In addition, the controller 12 is connected to the controller 11 through the communication cable 35. Such a field bus of the control network is constituted in accordance with such a connection mode of the communication cables. In this control network, data is communicated in accordance with a network standard of EtherCAT (registered trademark) using Ethernet (registered trademark). Meanwhile, specific contents of communication will be described later.

The controller 11, the controller 12, the database device 40, and the UI device 50 are connected to each other through the information communication network 60. The information communication network 60 performs communication according to a general-purpose network standard such as Ethernet and realizes a data link between the controller 11, the controller 12, the database device 40, and the UI device 50. Meanwhile, the control system 1 of the present invention may include at least a portion of a control network.

(Configuration of Controller)

Figure 2:
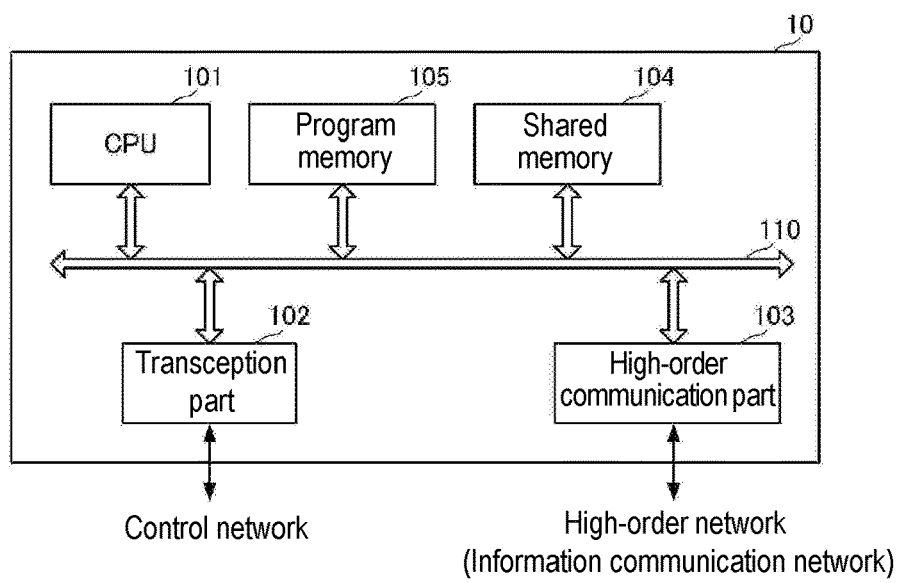
FIG. 2 is a block diagram showing a configuration of hardware in a controller.

The controller 11 and the controller 12 have the same configuration. FIG. 2 is a block diagram showing a configuration of hardware in a controller. Meanwhile, in FIG. 2, the controller 11 and the controller 12 have the same configuration, and thus the controllers will be described as being a controller 10.

As shown in FIG. 2, the controller 10 includes a CPU 101, a transception part 102, a high-order communication part 103, a shared memory 104, a program memory 105, and a system bus 110. The transception part 102, the high-order communication part 103, the shared memory 104, and the program memory 105 are connected to each other by the system bus 110.

The transception part 102 is realized by an ASIC or the like and is realized by a dedicated IC different from the CPU 101. Meanwhile, the transception part 102 may be realized by a FPGA or the like. The transception part 102 is connected to the control network and executes transmission and reception of a control frame.

The high-order communication part 103 is realized by a general-purpose communication IC. The high-order communication part 103 is connected to the information communication network 60 and executes transmission and reception through the information communication network 60.

The shared memory 104 stores various data for control received from the information communication network 60, PDO data constituting a control frame, and the like. The PDO data is constituted by a data group including output data which are output to the plurality of slave devices 21, 22, and 23 and input data which are input from the plurality of slave devices 21, 22, and 23.

A system program in which basic control of the controller 10 is recorded and a user program for control which is written by the UI device 50 are stored in the program memory 105. The user program may be different between a controller in a run mode and a controller in a data acquisition mode, which will be described later, and may be capable of selectively realizing both the run mode and the data acquisition mode.

Figure 3:
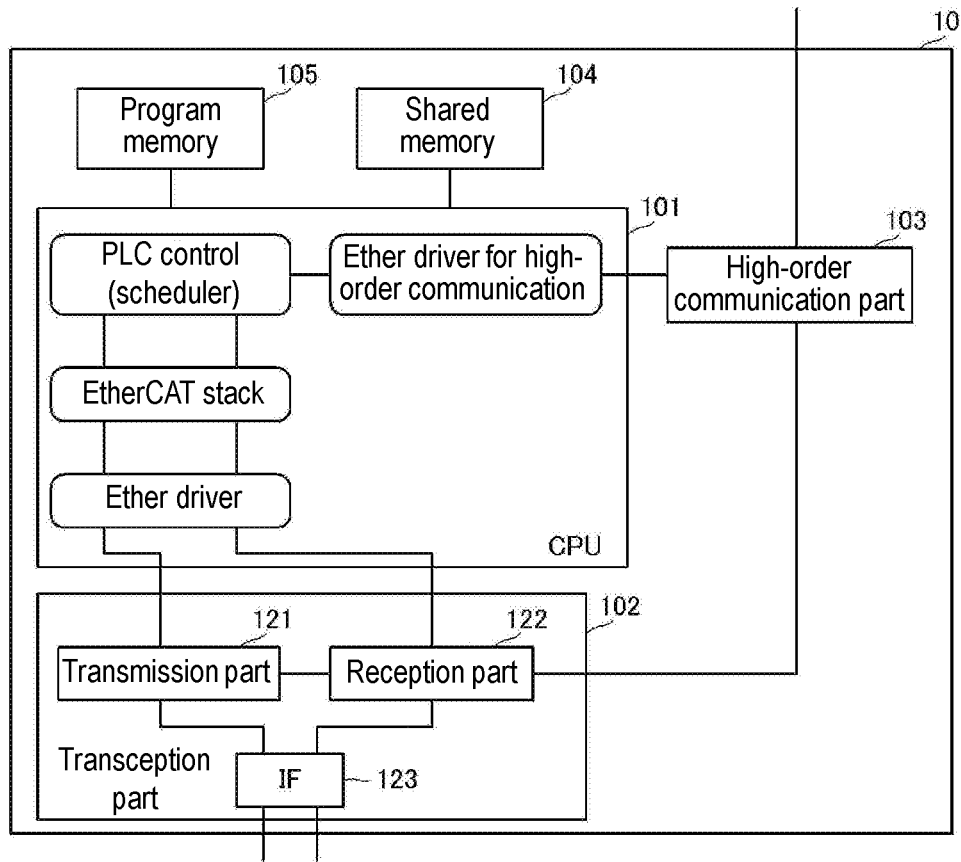
FIG. 3 is a block diagram showing a configuration related to a data communication in the controller.
Figure 4:
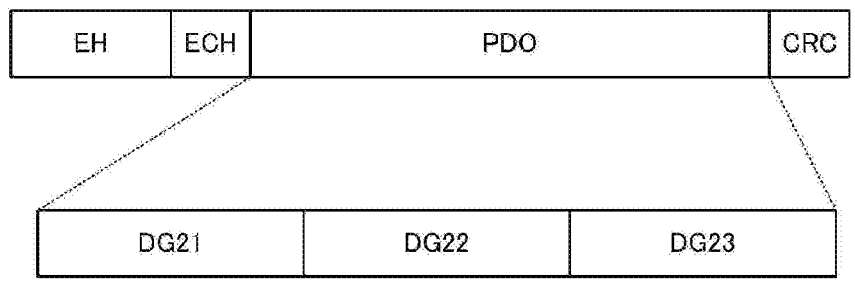
FIG. 4 is a diagram showing a schematic data configuration of control data.

FIG. 3 is a block diagram showing a configuration related to a data communication in the controller. FIG. 4 is a diagram showing a schematic data configuration of control data.

As shown in FIG. 3, the CPU 101 realizes a PLC control, an EtherCAT stack, an Ether driver, and an Ether driver for high-order communication.

The EtherCAT stack, the Ether driver, and the Ether driver for high-order communication are realized by the CPU 101 reading out and executing a system program from the program memory 105. The PLC control is realized by the CPU 101 reading out and executing a user program for control from the program memory 105.

The PLC control is performed to generate PDO data using data stored in the shared memory 104. That is, the PLC control is performed to generate the PDO data using input data such as measured values received from the slave devices 21, 22, and 23, calculation results based on the input data, a user program, control information obtained from the UI device 50, and the like. As shown in FIG. 4, the PDO data includes a data region DG21 for the slave device 21, a data region DG22 for the slave device 22, and a data region DG23 for the slave device 23. The data region DG21 for the slave device 21 is a writing region for output data which is output to the slave device 21 and input data which is input from the slave device 21, the data region DG22 for the slave device 22 is a writing region for output data which is output to the slave device 22 and input data which is input from the slave device 22, and the data region DG23 for the slave device 23 is a writing region for output data which is output to the slave device 23 and input data which is input from the slave device 23. Meanwhile, in the slave devices 21, 22, and 23, the data regions for the slave devices are only writing regions of output data which are output from the slave devices when the slave devices are devices, such as sensors, which do not require input data and require output data for control. On the other hand, in the slave devices 21, 22, and 23, the data regions for the slave devices are only writing regions of input data which are input to the slave devices when the slave devices are devices, such as switches, which require input data for control and do not require output data for control.

The PLC control is performed to execute scheduling of transmission of control data. The PLC control is performed to transmit PDO data to the EtherCAT stack. In addition, the PLC control is performed to extract input data associated from the slave devices 21, 22, and 23 from the PDO data received from the EtherCAT stack and to store the extracted input data in the shared memory 104.

The EtherCAT stack attaches an EtherCAT header (ECH in FIG. 4) to PDO data and transmits the PDO data to the Ether driver. In contrast, the EtherCAT stack extracts PDO data from frame data (ECH+PDO in FIG. 4) from the Ether driver and transmits the extracted PDO data to the PLC control.

The Ether driver attaches the Ethernet header (EH in FIG. 4) and CRC data (CRC in FIG. 4) to frame data (ECH+PDO in FIG. 4) received from the EtherCAT stack and outputs the frame data to a transmission part 121 of the transception part 102 as a control frame. In contrast, the Ether driver extracts frame data (ECH+PDO in FIG. 4) corresponding to the EtherCAT from the control frame (data shown in FIG. 4)

received from a reception part 122 of the transception part 102, and transmits the extracted frame data to the EtherCAT stack.

Meanwhile, the CPU 101 executes transmission and reception with respect to the information communication network 60 through the high-order communication part 103 using an Ether driver for high-order communication. Thereby, the CPU 101 receives a system program, a user program, and various data from the UI device 50 through the information communication network 60 and stores the received programs and data in the program memory 105 or the shared memory 104. Communication with the information communication network 60 is performed according to a general-purpose Ethernet or the like, and description thereof will be omitted.

(Configuration of Transception Part 102)

The transception part 102 includes the transmission part 121, the reception part 122, and an interface (IF) 123. The transmission part 121 and the reception part 122 are realized by individual ICs. The IF 123 realizes physical connection to a communication cable and includes at least two ports.

The transmission part 121 transmits a control frame received from the CPU 101 to the control network through the IF 123. In this case, the transmission part 121 transmits the control frame with a time stamp provided thereto. In addition, the transmission part 121 can also transmit a control frame copied from the reception part 122 shown next to the control network through the IF 123. Further, the transmission part 121 can generate a diagnosis frame to be described later and transmit the generated diagnosis frame to the control network through the IF 123 at a predetermined time.

The reception part 122 transmits the control frame received from the control network through the IF 123 to the CPU 101. The reception part 122 can also copy the control frame. The reception part 122 can also transmits the copied control frame to the transmission part 121 or the high-order communication part 13. In this case, the reception part 122 directly transmits the copied control frame to the transmission part 121 or the high-order communication part 13 without going through the CPU 101.

(Abnormality Detection)

Figure 5:
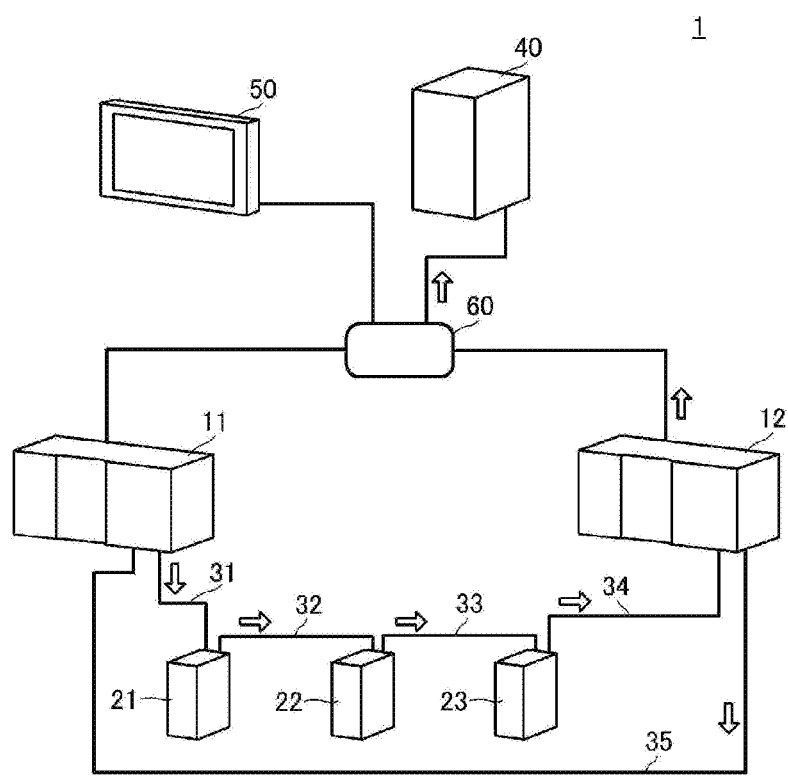
FIG. 5 is a diagram showing an outline of data communication for storing a control frame.

FIG. 5 is a diagram showing an outline of data communication for storing a control frame. In FIG. 5, a bold arrow indicates a flow of the control frame.

In a process of collecting a control frame for abnormality detection, the controller 11 is set to be in a run mode, and the controller 12 is set to be in a data acquisition mode. The controller 11 corresponds to a "first controller" of the present invention, and the controller 12 corresponds to a "second controller" of the present invention.

The controller 11 in a run mode executes schedule management of transmission and reception of a control frame, calculation using input data received from the slave devices 21, 22, and 23, generation of output data using a calculation result, and generation of a control frame. That is, the controller 11 in a run mode executes control of data communication with the plurality of slave devices 21, 22, and 23 through cyclic communication using a control network at high speed.

The controller 12 in a data acquisition mode receives a control frame and transmits the received control frame to the database device 40 of the information communication network 60 without executing management of control data communication with the plurality of slave devices 21, 22, and 23 as in the controller 11.

When the controller 11 generates a control frame as shown in FIG. 4, the controller transmits the generated control frame to the control network. That is, the controller 11 transmits the control frame through the communication cable 31.

The slave device 21 receives the control frame through the communication cable 31. The slave device 21 acquires output data for the slave device 21 which is described in the control frame and writes input data acquired by the slave device 21 in the control frame. Meanwhile, the slave device 21 controls a control target device connected to the slave device 21 based on output data. In addition, the slave device 21 acquires a measured value from the control target device and sets the measured value as input data in the next control cycle.

The slave device 21 imparts a time stamp to the control frame. The slave device 21 transmits the control frame through the communication cable 32.

The slave device 22 receives the control frame through the communication cable 32. The slave device 22 acquires output data for the slave device 22 which is described in the control frame and writes input data acquired by the slave device 22 in the control frame. Meanwhile, the slave device 22 controls a control target device connected to the slave device 22 based on output data. In addition, the slave device 22 acquires a measured value from the control target device and sets the measured value as input data in the next control cycle.

The slave device 22 imparts a time stamp to the control frame. The slave device 22 transmits the control frame through the communication cable 33.

The slave device 23 receives the control frame through the communication cable 33. The slave device 23 acquires output data for the slave device 23 which is described in the control frame and writes input data acquired by the slave device 23 in the control frame. Meanwhile, the slave device 23 controls a control target device connected to the slave device 23 based on output data. In addition, the slave device 23 acquires a measured value from the control target device and sets the measured value as input data in the next control cycle.

The slave device 23 imparts a time stamp to the control frame. The slave device 23 transmits the control frame through the communication cable 34.

The controller 12 receives the control frame through the communication cable 34. The controller 12 copies the control frame and transmits the control frame through the communication cable 35. In this case, the controller 12 imparts a time stamp to the control frame. The control frame is received by the controller 11 through the communication cable 35. In addition, the controller 12 transmits the copied control frame to the database device 40 connected through the information communication network 60.

(Specific Process of Controller 11 in Run Mode)

Figure 6:
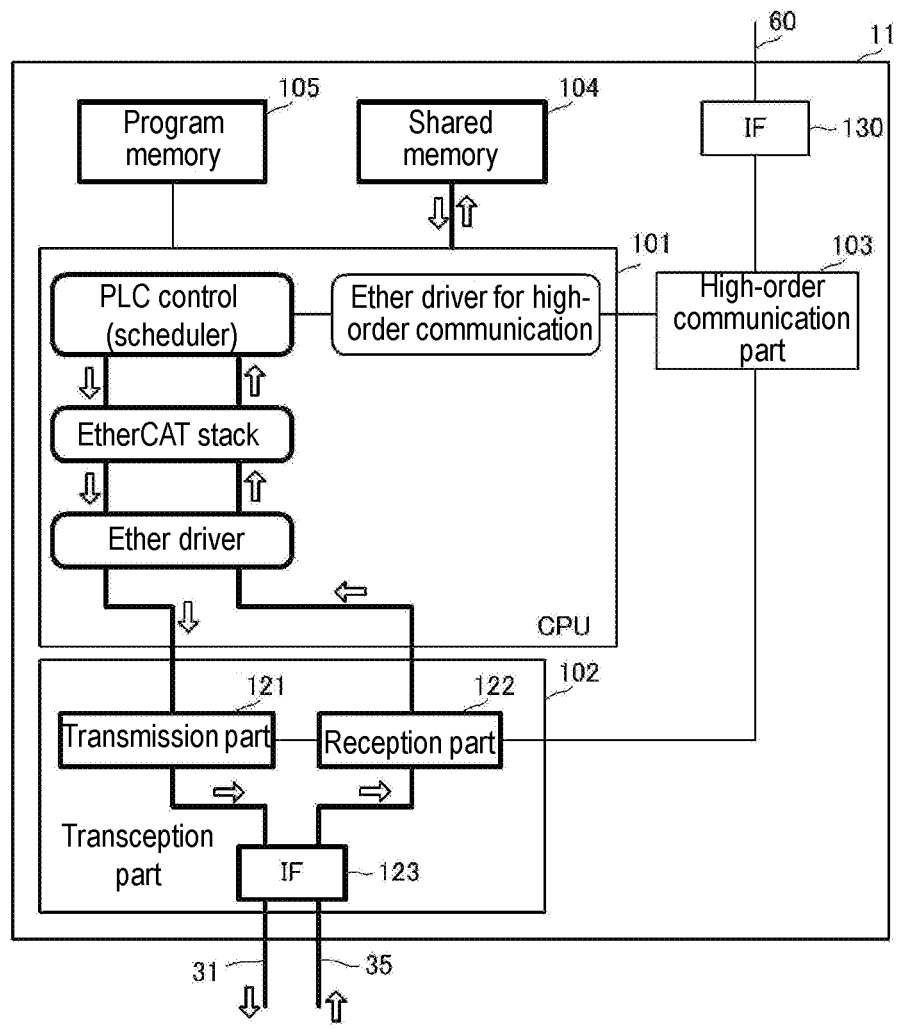
FIG. 6 is a diagram showing the state of data transmission in the controller in a run mode.

The controller 11 set to be in a run mode specifically executes the next process. The setting of the controller to be in a run mode is executed in response to, for example, a control command received from the UI device 50. FIG. 6 is a diagram showing the state of data transmission in the controller in a run mode.

In the controller 11, the CPU 101 generates a control frame by PLC control, an EtherCAT stack, and an Ether driver using a data group stored in the shared memory 104, as described above. This control frame generation process is executed in accordance with a control cycle determined through PLC control. The CPU 101 outputs the control frame to the transmission part 121 of the transception part 102.

The transmission part 121 transmits the control frame to the communication cable 31 through the IF 123 in the above-described control cycle.

On the other hand, in the controller 11, the reception part 122 of the transception part 102 receives a control frame returned from the control network through the communication cable 35 and the IF 123. The reception part 122 outputs the control frame to the CPU 101.

As described above, the CPU 101 extracts PDO data from the control frame by an Ether driver, an EtherCAT stack, and PLC control. The CPU 101 stores the PDO data in the shared memory 104. Meanwhile, the CPU 101 may extract input data received from the plurality of slave devices 21, 22, and 23 from the PDO data and store only the input data in the shared memory 104.

The controller 11 repeatedly executes the generation and the transmission and reception of the control frame and the storage of PDO data returned from the control network in accordance with the above-described control cycle.

Figure 7:
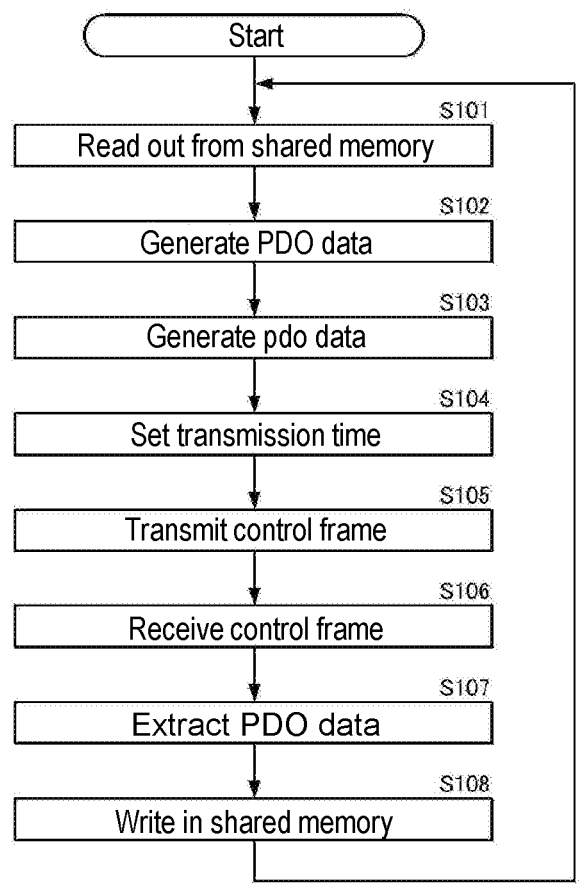
FIG. 7 is a flowchart showing a schematic process executed by the controller in a run mode.

That is, the controller 11 executes a process shown in FIG. 7. FIG. 7 is a flowchart showing a schematic process executed by the controller in a run mode. Meanwhile, the process shown in FIG. 7 is executed by the CPU 101 and the transception part 102, but can be executed by only the CPU 101.

As shown in FIG. 7, the controller 11 reads out data groups required for a current control frame including the previous PDO data from the shared memory 104 (S101). The controller 11 generates current PDO data using these data groups (S102). The controller 11 generates a control frame using the PDO data (S103). The controller 11 sets a transmission time from a control cycle (S104). The controller 11 transmits the control frame in synchronization with the transmission time (S105). The controller 11 receives a control frame returned from the control network (S106). The controller 11 extracts PDO data from the returned control frame (S107). The controller 11 writes the PDO data in the shared memory 104 (S108). When these processes are terminated, the controller 11 returns to step S101 to repeat the process.

(Specific Process of Controller 12 in Data Acquisition Mode)

Figure 8:
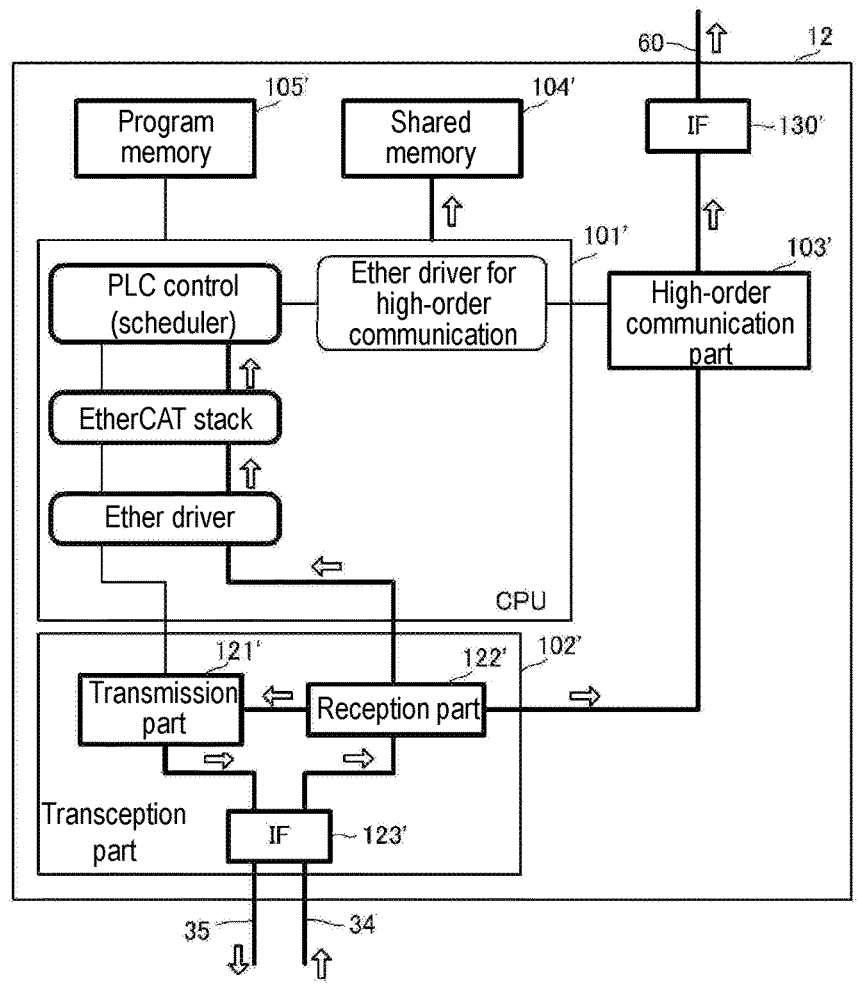
FIG. 8 is a diagram showing the state of data transmission in the controller in a data acquisition mode.

The controller 12 set to be in a data acquisition mode specifically executes the next process. The setting of the controller to be in a data acquisition mode is executed in response to, for example, a control command received from the UI device 50. FIG. 8 is a diagram showing the state of data transmission in the controller in a data acquisition mode.

In the controller 12, a reception part 122' of the transception part 102' receives a control frame transmitted from the control network, that is, having passed through all of the slave devices 21, 22, and 23 through the communication cable 34 and an IF 123'. The reception part 122' copies the control frame. The reception part 122' outputs the control frame to a CPU 101' and outputs the control frame to a transmission part 121'. PDO data which is input to the CPU 101' is stored in the shared memory 104, similar to the CPU 101.

The transmission part 121' outputs the control frame to the communication cable 35 through the IF 123'. That is, the reception part 122' and the transmission part 121' execute loopback of the control frame in the control network.

In addition, the reception part 122' transmits the control frame to the high-order communication part 103'. This transmission is performed using, for example, a direct memory access (DMA) transmission method. The high-order communication part 103' transmits the control frame to the database device 40 of the information communication network 60 through an IF 130'. Meanwhile, in this case, the controller 12 imparts a time stamp to the control frame.

The controller 12 executes return of the control frame and transmission to the information communication network 60 every time a control frame is received.

Figure 9:
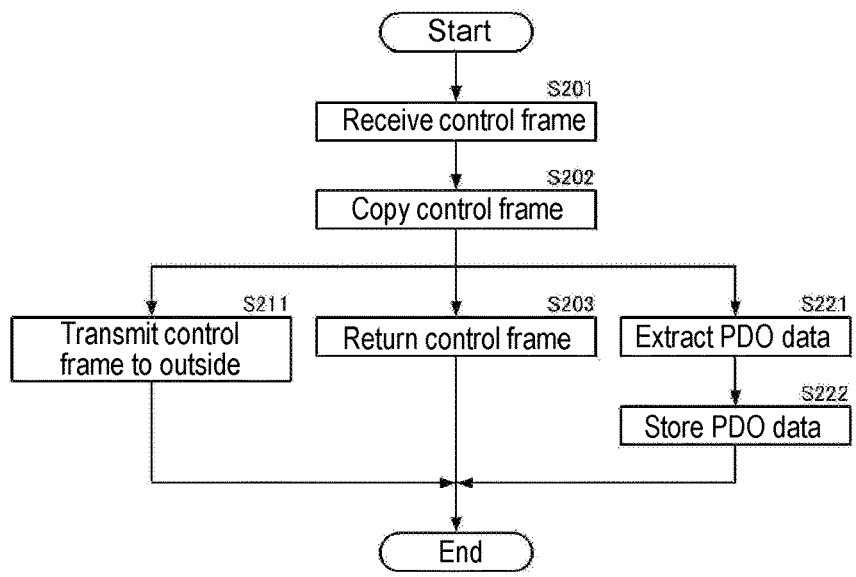
FIG. 9 is a flowchart showing a schematic process executed by the controller in a data acquisition mode.

That is, the controller 12 executes a process shown in FIG. 9. FIG. 9 is a flowchart showing a schematic process executed by the controller in a data acquisition mode. Meanwhile, the process shown in FIG. 9 is executed by the CPU 101', the transception part 102' and the high-order communication part 103', but can also be executed by only the CPU 101'.

As shown in FIG. 9, the controller 12 receives a control frame transmitted from the control network (S201). The controller 12 copies the control frame (S202). The controller 12 returns the control frame to the control network (S203). The controller 12 transmits the control frame to the database device 40 of the information communication network 60 (S211). The controller 12 extracts PDO data from the control frame (S221) and stores the extracted PDO data in a shared memory 104' (S222). Meanwhile, when the redundancy of the controller to be described later is not required, the controller 12 may not extract and store the PDO data.

As described above, in the control system 1, the controller 11 in a run mode does not perform storage of a control frame for abnormality detection and transmission of the control frame to the information communication network 60. That is, the controller 11 in a run mode exclusively executes cyclic control of the plurality of slave devices 21, 22, and 23.

On the other hand, the controller 12 in a data acquisition mode does not perform management of transmission and reception of a control frame. That is, the controller 12 in a data acquisition mode exclusively executes storage of a control frame for abnormality detection and transmission of the control frame to the information communication network 60.

With such a configuration, the control system 1 can inhibit reduction in the amount of acquisition of control frames for abnormality detection while reliably performing communication of a control frame between the controller and the plurality of slave devices, irrespective of the amount of data communicated through the control network.

Further, in the control system 1, the controller 12 in a data acquisition mode is connected to the ends of the plurality of slave devices 21, 22, and 23 starting from the controller 11 in a run mode. Therefore, the controller 12 can receive a control frame including PDO data updated by all of the slave devices 21, 22, and 23 in a current control cycle. Thereby, the controller 12 can efficiently acquire a control frame updated to the latest state.

Further, in the control system 1, the controller is constituted by the CPU and the transception part, and thus it is possible to inhibit a delay of return of the above-described control frame and to inhibit lengthening of a control cycle due to connection of the controller in a data acquisition mode. In addition, a CPU is not used at the time of transmitting a control frame to the database device 40 of the information communication network 60, and thus a load of the CPU is reduced.

(Transmission and Storage of Diagnosis Frame)

Meanwhile, in the above-described configuration and process, a mode in which a control frame periodically communicated in accordance with a control cycle is stored and transmitted has been described, but it is also possible to generate a diagnosis frame and store and transmit the diagnosis frame.

Figure 10:
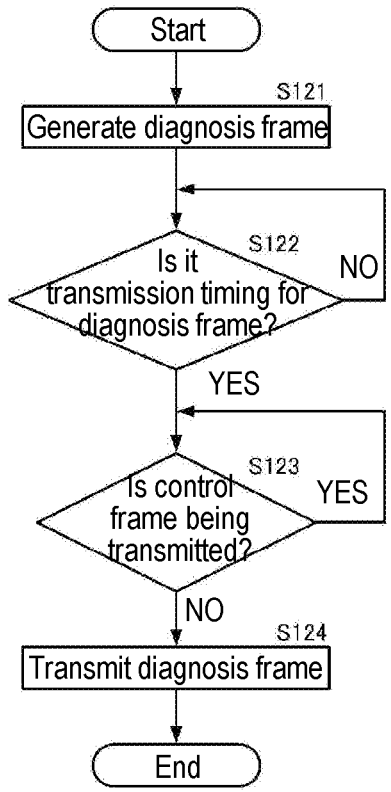
FIG. 10 is a flowchart showing a diagnosis frame transmission process of the controller in a run mode.

FIG. 10 is a flowchart showing a diagnosis frame transmission process of the controller in a run mode. As shown in FIG. 10, the controller 11 generates a diagnosis frame (S121). The controller 11 detects whether or not it is a transmission timing for the diagnosis frame. The transmission timing for the diagnosis frame is set in advance at predetermined time intervals or is determined in response to a transmission request for the diagnosis frame which is received from the UI device 50. When it is a transmission timing for the diagnosis frame (S122: YES) and a control frame is being transmitted (S123: NO), the controller 11 transmits the diagnosis frame to the control network (S124).

Figure 11:
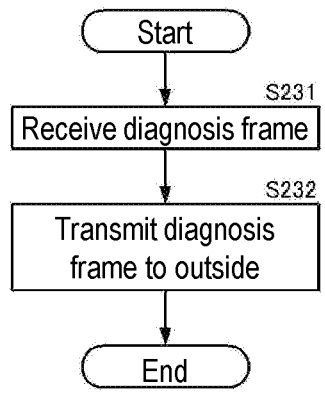
FIG. 11 is a flowchart showing a process of receiving and transmitting the diagnosis frame by the controller in a data acquisition mode.

FIG. 11 is a flowchart showing a process of receiving and transmitting the diagnosis frame by the controller in a data acquisition mode. As shown in FIG. 11, the controller 12 receives the diagnosis frame (S231). The controller 12 transmits the diagnosis frame to the database device 40 of the information communication network 60 (S232). In this case, when the controller 12 detects being the diagnosis frame, the controller may not perform copying and return as in the above-described control frame.

With such a configuration and process, the control system 1 can transmit and store a diagnosis frame for abnormality detection while reliably performing communication of a control frame between the controller and the plurality of slave devices. Therefore, it is possible to acquire a larger amount of frame data for abnormality detection and acquire data for performing detailed abnormality detection.

Further, the diagnosis frame transmission process in the above-described controller 11 is executed by the transception part 102, so that it is possible to inhibit an increase in a processing load of the CPU 101 of the controller 11 due to the use of a diagnosis frame.

Further, in the above description, a mode in which the controller 11 does not transmit a control frame and a diagnosis frame to the database device 40 of the information communication network 60 has been described. However, the controller 11 may transmit a control frame and a diagnosis frame to the database device 40 of the information communication network 60. Here, a control frame and a diagnosis frame are not transmitted to the, database device 40 of the information communication network 60, so that it is possible to secure a communication band between the CPU 101 of the controller 11 and the UI device 50 through the information communication network 60. Therefore, communication of control data between the UI device 50 and the CPU 101 of the controller 11 can be performed reliably and at high speed.

Figure 12:
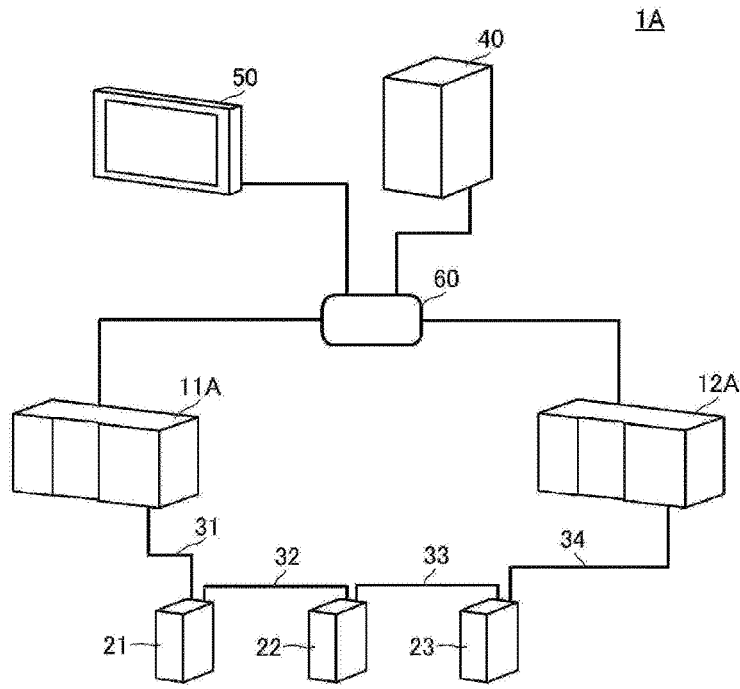
FIG. 12 is a diagram showing a configuration of a device in the control system.

Meanwhile, in the above description, the controller 11 and the controller 12 are connected to each other through the communication cable 35. However, the communication cable 35 can also be omitted. FIG. 12 is a diagram showing a configuration of a device in the control system. As shown in FIG. 12, a control system 1A includes a controller 11A, a controller 12A, a plurality of slave devices 21, 22, and 23, a plurality of communication cables 31, 32, 33, and 34, a database device 40, a user interface device (UI device) 50, and an information communication network 60. The control system 1A shown in FIG. 12 has a configuration in which a communication cable 35 is omitted with respect to the control system 1 shown in FIG. 1. Therefore, hereinafter, only new parts required to be described and different from those of the control system shown in FIG. 1 will be described.

The controller 11A, the slave device 21, the slave device 22, the slave device 23, and the controller 12A are linearly connected in this order. In other words, the plurality of slave devices 21, 22, and 23 is connected in order from a first end to a second end with the controller 11A as the first end and the controller 12A as the second end. However, the controller 11A and the controller 12A are not directly connected to each other. In this case, a control frame transmitted from the controller 11A and having reached the controller 12A is looped back by the controller 12A and returns to the controller 11A through the slave device 23, the slave device 22, and the slave device 21 in this order.

(Specific Process of Controller 11A in Run Mode)

Figure 13:
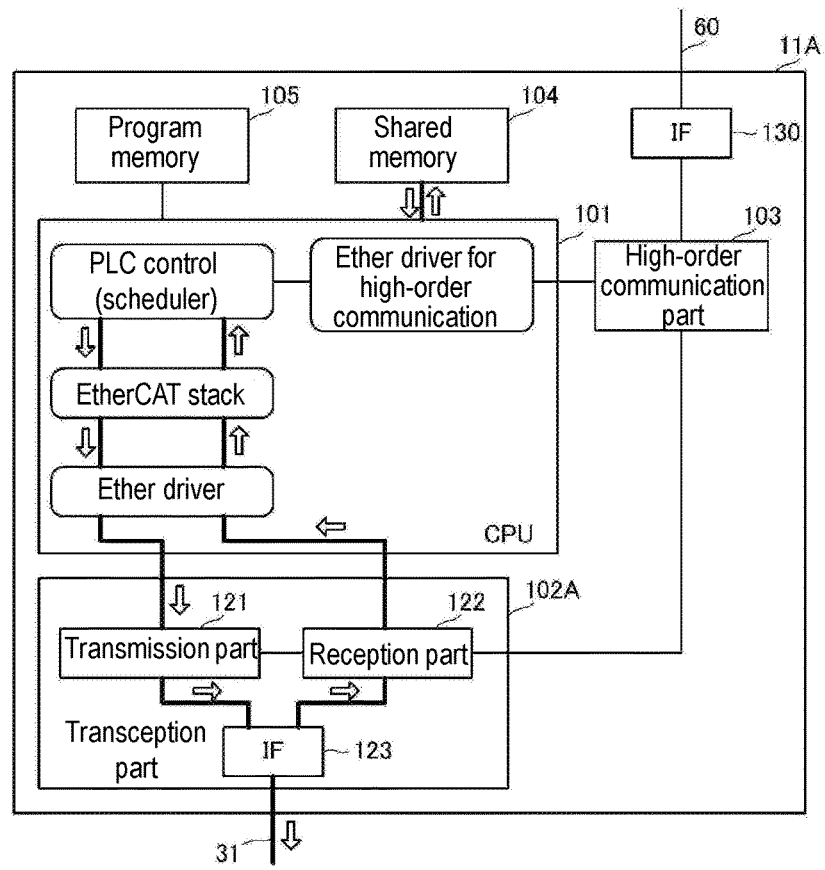
FIG. 13 is a diagram showing the state of data transmission in the controller in a run mode.

The controller 11A set to be in a run mode specifically executes the next process. FIG. 13 is a diagram showing the state of data transmission in the controller in a run mode.

In the controller 11A, the CPU 101 generates a control frame by PLC control, an EtherCAT stack, and an Ether driver using a data group stored in the shared memory 104, as described above. This control frame generation process is executed in accordance with a control cycle determined through PLC control. The CPU 101 outputs the control frame to the transmission part 121 of the transception part 102.

The transmission part 121 transmits the control frame to the communication cable 31 through an IF 123 in the above-described control cycle.

On the other hand, in the controller 11, the reception part 122 of the transception part 102 receives a control frame returned from the control network through the communication cable 31 and the IF 123. The reception part 122 outputs the control frame to the CPU 101.

(Specific Process of Controller 12A in Data Acquisition Mode)

Figure 14:
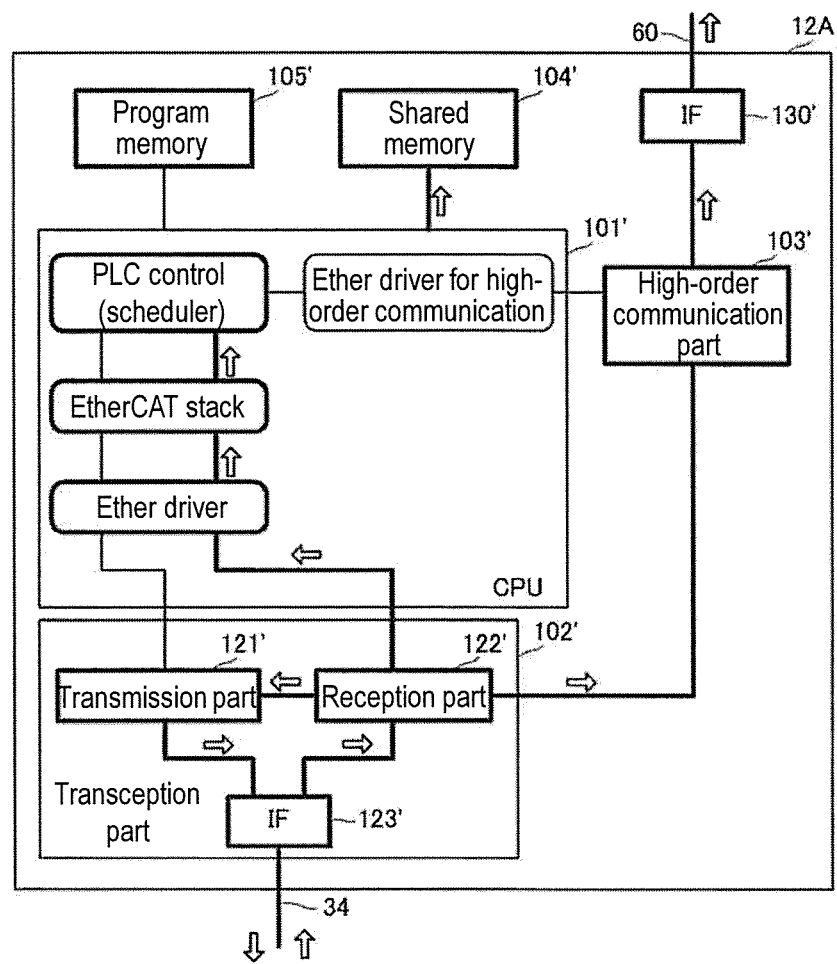
FIG. 14 is a diagram showing the state of data transmission in the controller in a data acquisition mode.

The controller 12A set to be in a data acquisition mode specifically executes the next process. FIG. 14 is a diagram showing the state of data transmission in the controller in a data acquisition mode.

In the controller 12A, a reception part 122' of a transception part 102' receives a control frame transmitted from the control network through the communication cable 34 and an IF 123'. The reception part 122' copies the control frame. The reception part 122' outputs the control frame to a CPU 101' and outputs the control frame to a transmission part 121'.

The transmission part 121' outputs the control frame to the communication cable 34 through an IF 123'. That is, the reception part 122' and the transmission part 121' execute loopback of the control frame in the control network.

In addition, the reception part 122' transmits the control frame to the high-order communication part 103'. This transmission is performed using, for example, a direct memory access (DMA) transmission method. The high-order communication part 103' transmits the control frame to the database device 40 of the information communication network 60 through an IF 130'. Meanwhile, in this case, the controller 12 imparts a time stamp to the control frame.

The controller 12 loops back the control frame and executes transmission to the information communication network 60 every time a control frame is received.

Even the control system 1A having such a configuration can inhibit a reduction in the amount of acquisition of control frames for abnormality detection while reliably performing communication of a control frame between the controller and the plurality of slave devices, irrespective of the amount of data communicated through the control network.

(Redundancy of Controller)

The control system 1 having the above-described configuration can cope with the redundancy of a controller. In general, the redundancy of a controller is a configuration in which controllers capable of generating, transmitting, and receiving control frames are connected to both ends of a control network having the plurality of slave devices 21, 22, and 23, respectively (similar configuration as those in FIGS. 1 and 12). Further, in the redundancy of a controller, any one of the controllers at both ends is used for the generation of a control frame and schedule management.

Figure 15:
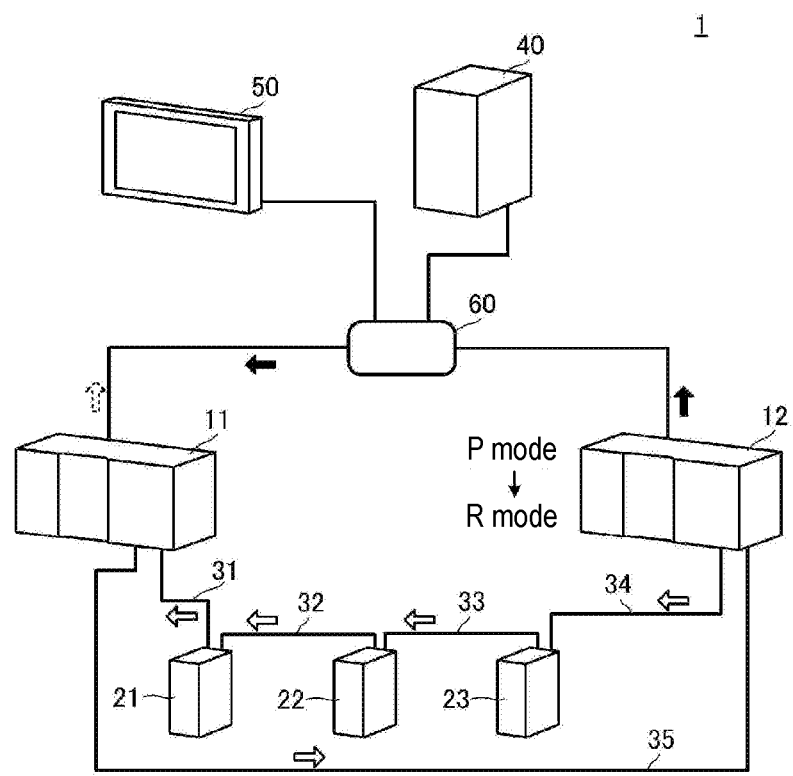
FIG. 15 is a diagram showing an example of an outline of redundancy of the controller.

FIG. 15 is a diagram showing an example of an outline of redundancy of the controller. FIG. 15 shows a mode in which the controller 11 fails during execution of a run mode and the controller 12 switches from a data acquisition mode to a run mode. In FIG. 15, a black bold arrow indicates a transmission state of a beacon, and a white bold arrow indicates a transmission state of a control frame.

As shown in FIG. 15, the controller 12 transmits a beacon (corresponding to an "operation confirmation signal" of the present invention) to the controller 11 through the information communication network 60. When there is no response signal of the beacon, the controller 12 switches from a data acquisition mode (a P mode in FIG. 15) to a run mode (an R mode in FIG. 15). In addition, the controller 12 generates a control frame for the control network to which the plurality of slave devices 21, 22, and 23 is connected, and transmits the control frame to the control network. When the controller 11 has the above-described configuration, loopback communication of a control frame can be performed by the transception part 102 even when the CPU 101 fails.

(Specific Process of Controller 12 that Switches from Data Acquisition Mode to Run Mode)

Figure 16:
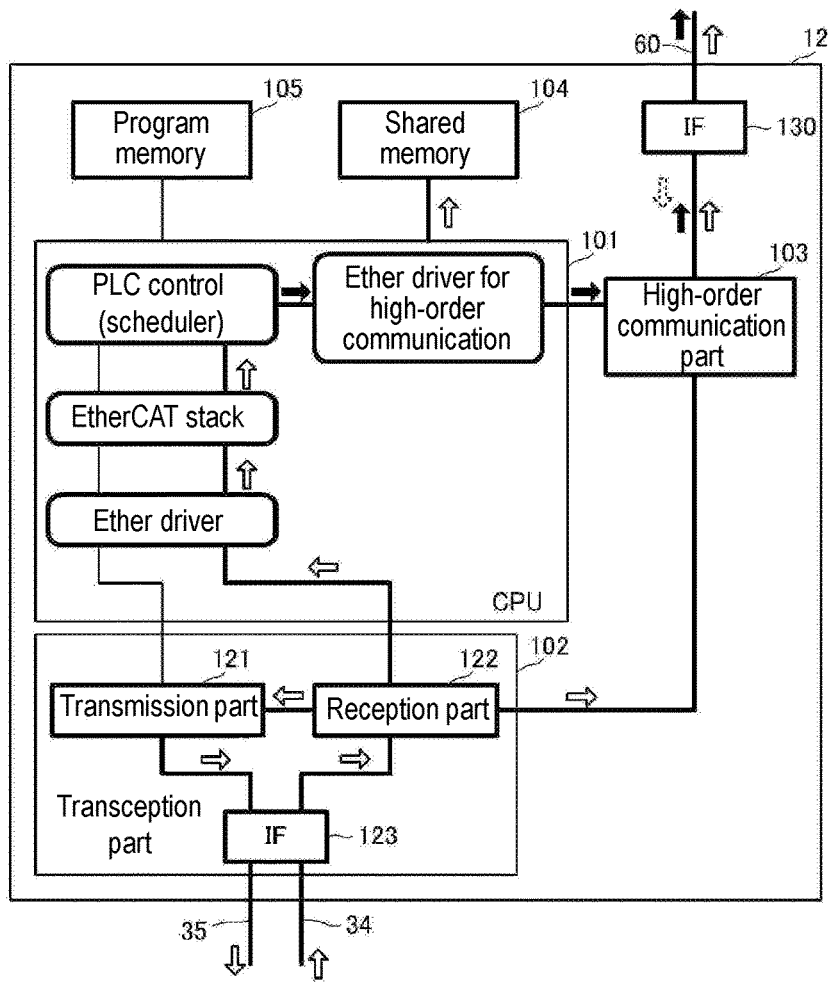
FIG. 16 is a diagram showing the state of data transmission in the controller when switching from a data acquisition mode to a run mode.

FIG. 16 is a diagram showing the state of data transmission in the controller when switching from a data acquisition mode to a run mode. In FIG. 16, a black bold arrow indicates a transmission state of a beacon, and a white bold arrow indicates a transmission state of a control frame.

The controller 12 sequentially executes the copying and loopback of the above-described control frame, the transmission to the database device 40 of the information communication network 60, and the storage of PDO data in the shared memory 104 in a period in which the controller is set to be in a data acquisition mode.

Along with these processes, the CPU 101 of the controller 12 generates a beacon in PLC control. In this case, the CPU 101 generates a beacon at a preset cycle for operation confirmation. The cycle for operation confirmation is set to a constant multiple (for example, approximately two times to five times) of the control cycle of the control network. Meanwhile, the constant is an example and may be any of other values. In addition, the CPU 101 detects that the output of a control frame has been stopped when a control frame is not output from the transception part 102 over a predetermined period of time, and generates a beacon.

An Ether driver for high-order communication attaches an Ethernet header with the controller 11 as a reception destination to the beacon, and outputs the beacon to the high-order communication part 103. The high-order communication part 103 outputs the beacon to the information communication network 60 through an IF 130.

In PLC control in the CPU 101 of the controller 12, switching from a data acquisition mode to a run mode is executed when a response signal of a beacon cannot be detected.

Figure 17:
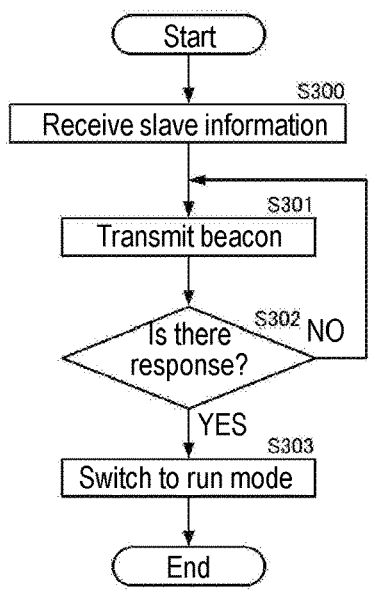
FIG. 17 shows a first mode for determining switching using only a response of a beacon.
Figure 18:
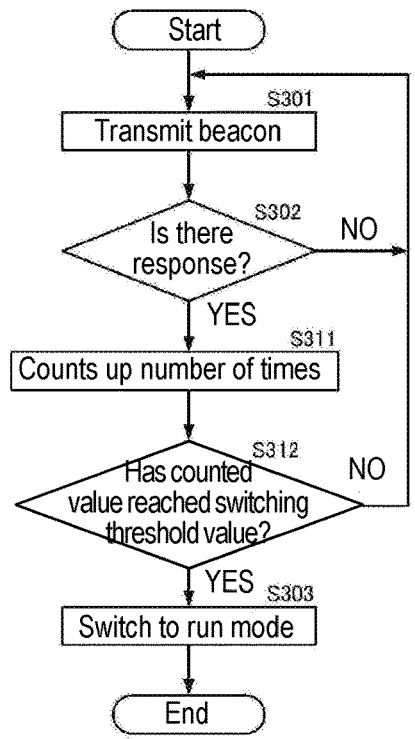
FIG. 18 shows a second mode for determining switching using only a response of a beacon.
Figure 19:
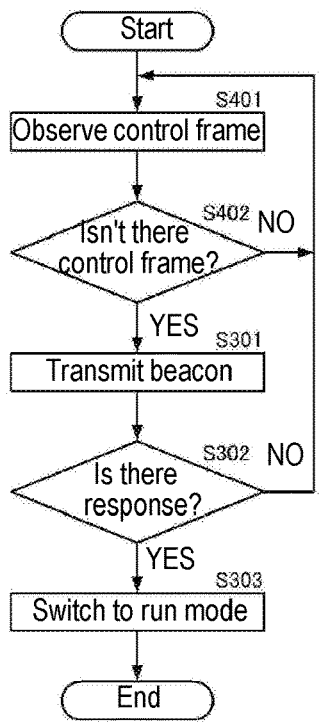
FIG. 19 shows a mode for determining switching using an observation result of a control frame and a response of a beacon.

Specifically, the controller 12 executes a process as shown in any one of the following FIGS. 17, 18, and 19.

FIG. 17 is a flowchart showing a schematic process executed by the controller switching from a data acquisition mode to a run mode. FIG. 17 shows a first mode for determining switching using only a response of a beacon.

As shown in FIG. 17, the controller 12 receives slave information, that is, information of the plurality of slave devices 21, 22, and 23 connected to the control network (S300). Such information of the plurality of slave devices 21, 22, and 23 is acquired when the controller 11 constructs the control network, is transmitted from the controller 11, and is received by the controller 12. Meanwhile, this process is a preliminary process for switching from a data acquisition mode to a run mode, but is not an essential process in switching from a data acquisition mode to a run mode, and the process may be realized by another method.

The controller 12 generates a beacon and transmits the generated beacon to the controller 11 through the information communication network 60 (S301). When there is a response signal to the beacon (S302: NO), the controller 12 repeatedly transmitting the beacon at the above-described cycle for operation confirmation.

When there is no response signal to the beacon (S302: YES), the controller 12 switches from a data acquisition mode to a run mode (S303).

FIG. 18 is a flowchart showing a schematic process executed by the controller switching from a data acquisition mode to a run mode. FIG. 18 shows a second mode for determining switching using only a response of a beacon.

As shown in FIG. 18, the controller 12 generates a beacon and transmits the generated beacon to the controller 11 through the information communication network 60 (S301). When there is a response signal to the beacon (S302: NO), the controller 12 repeatedly transmitting the beacon at the above-described cycle for operation confirmation.

When there is no response signal to the beacon (S302: YES), the controller 12 counts up the number of times there is no response to the transmission of the beacon (S311). When a counted value has not reached a switching threshold value (S312: NO), the controller 12 repeatedly transmitting the beacon at the above-described cycle for operation confirmation.

When the counted value has reached the switching threshold value (S312: YES), the controller 12 switches from a data acquisition mode to a run mode (S303).

The process shown in FIG. 18 is used, and thus switching of an erroneous mode due to a communication error of a beacon through the information communication network 60, or the like is inhibited.

FIG. 19 is a flowchart showing a schematic process executed by the controller switching from a data acquisition mode to a run mode. FIG. 19 shows a mode for determining switching using an observation result of a control frame and a response of a beacon.

The controller 12 observes a control frame (S401). When a control frame can be received (S402: NO), the controller 12 repeatedly observes the control frame.

When a control frame cannot be received for a predetermined period of time (S402: YES), the controller 12 generates a beacon and transmits the generated beacon to the controller 11 through the information communication network 60 (S301). Here, the predetermined period of time is, for example, a constant multiple of a control cycle. When there is a response signal to the beacon (S302: NO), the controller 12 repeatedly transmitting the beacon at the above-described cycle for operation confirmation.

When there is no response signal to the beacon (S302: YES), the controller 12 switches from a data acquisition mode to a run mode (S303).

The process shown in FIG. 19 is used, and thus it is possible to detect a failure of the controller 11, and the like based on a communication state of the control frame in the control network and the beacon through the information communication network 60. Thereby, the accuracy of detection for the controller 11 is improved.

Figure 20:
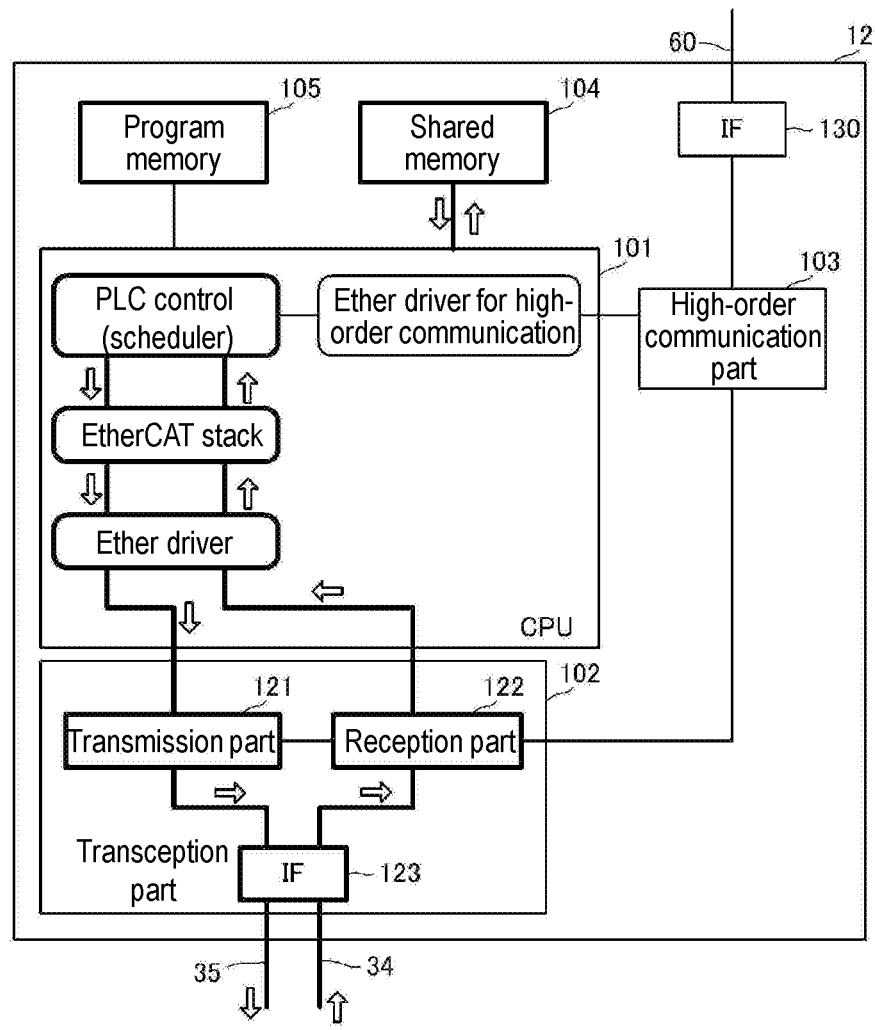
FIG. 20 is a diagram showing the state of data transmission in a controller after switching to a run mode.

In this manner, when the controller switches from a data acquisition mode to a run mode, the controller 12 executes a process as shown in FIG. 20. FIG. 20 is a diagram showing the state of data transmission in a controller after switching to a run mode. The process shown in FIG. 20 is a process in which a main body of the process is replaced from the controller 11 to the controller 12, with respect to the process shown in FIG. 6. Therefore, description of a detailed process will be omitted. That is, when the controller 12 switches to a run mode, the controller executes a process similar to the process executed by the controller 11 in the control network.

As described above, the above-described configuration and process are used, and thus it is possible to continue control using the control network by the controller 12 even when the controller 11 cannot perform the generation of a control frame and schedule management due to a failure or the like. That is, a stop period of control for the control network hardly occurs.

In this case, the controller 12 stores PDO data in the shared memory 104 in a data acquisition mode as described above. Therefore, the controller 12 already holds PDO data so far when switching to a run mode. Thereby, the controller 12 can rapidly and reliably generate a control frame.

Further, as described above, the controller 12 acquires information of the plurality of slave devices 21, 22, and 23 from the controller 11 and stores the acquired information in the shared memory 104 before switching to a run mode. Thereby, the controller 12 does not need to acquire the information of the plurality of slave devices 21, 22, and 23 from the plurality of slave devices 21, 22, and 23 again after switching. Therefore, it is possible to more rapidly and reliably generate a control frame.

Further, in the controller 11, when the CPU 101 fails or runs away and the transception part 102 is normal, a control frame is copied by the transception part 102 in the controller 11. In addition, the copied control frame is transmitted to the database device 40 of the information communication network 60 through the transception part 102 and the high-order communication part 103. Thereby, the transmission of a control frame for abnormality detection is continued.

(Specific Process of Mode Switching Between Controller 11 and Controller 12)

Figure 21:
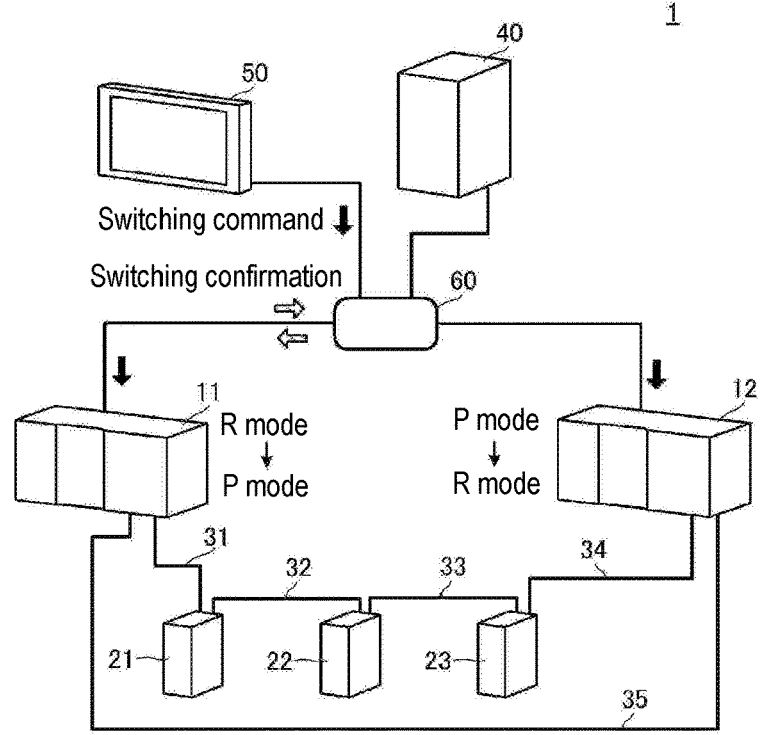
FIG. 21 is a diagram showing the state of data transmission in mode switching between two controllers connected to a control network.

FIG. 21 is a diagram showing the state of data transmission in mode switching between two controllers connected to a control network. In FIG. 21, a black bold arrow indicates a transmission state of a switching command signal, and a hatched bold arrow indicates a transmission state of a switching confirmation signal.

The UI device 50 transmits a switching command signal to the controller 11 operating in a run mode and the controller 12 operating in a data acquisition mode through the information communication network 60. When the controller 11 and the controller 12 receive a switching command signal, the controllers transmit and receive the switching confirmation signal to and from each other through the information communication network 60.

Thereafter, the controller 11 stops a run mode and starts a data acquisition mode. In synchronization with this, the controller 12 starts a run mode and stops a data acquisition mode.

Figure 22:
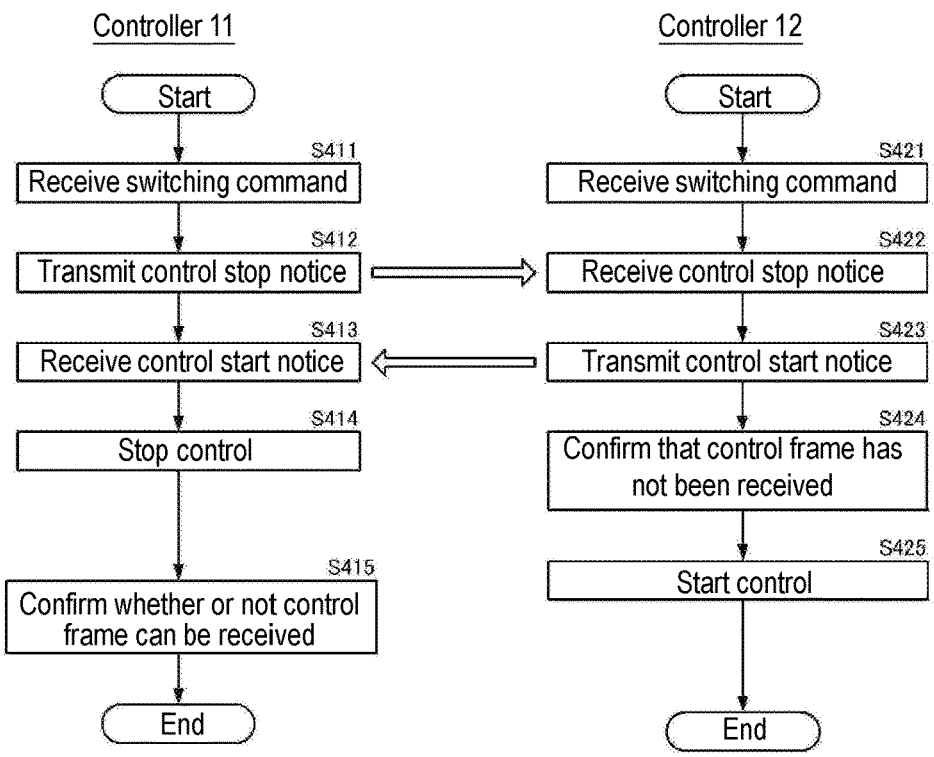
FIG. 22 is a flowchart showing a schematic process of mode switching executed by two controllers.

FIG. 22 is a flowchart showing a schematic process of mode switching executed by two controllers.

When the controller 11 receives a switching command signal (S411), the controller transmits a control stop notice signal which is a switching confirmation signal to the controller 12 (S412). The control stop notice signal may include, for example, a time when control is stopped, and the like.

When the controller 12 receives a switching command signal (S421), the controller waits for the reception of the control stop notice signal and receives the control stop notice signal (S422). The controller 12 analyzes the control stop notice signal and transmits the control start notice signal to the controller 11 (S423).

When the controller 11 receives the control start notice signal (S413), the controller stops control. Thereby, the controller 11 switches from a run mode to a data acquisition mode. Thereafter, the controller 11 observes a control frame and confirms whether or not the control frame can be received (S415).

The controller 12 observes a control frame after transmitting the control start notice signal and confirms that a control frame has not been received (S424). Thereafter, the controller 12 starts switching from a data acquisition mode to a run mode, generation of a control frame, and transmission and reception of a control frame to the control network (S425).

In this manner, in the control system 1, a controller in a run mode and a controller in a data acquisition mode can be mutually switched under the control of the UI device 50. Thereby, for example, rewriting and updating of firmware can be realized while continuing control of the plurality of slave devices 21, 22, and 23. For example, rewriting of firmware is performed on the controller 12 in a data acquisition mode, and switching between a run mode and a data acquisition mode with respect to the controller 11 and the controller 12 is executed. In addition, rewriting of firmware is performed on the controller 11 set to be in a data acquisition mode.

In this case, the controller in a data acquisition mode hardly has a load on the CPU 101 for control of the plurality of slave devices. Therefore, downloading and rewriting of firmware can be rapidly and reliably performed.

(Redundancy of Cable)

The control system 1 having the above-described configuration can cope with the redundancy of a cable. In general, the redundancy of a cable is a configuration in which two controllers respectively connected to both ends of a control network having the plurality of slave devices 21, 22, and 23 are connected through two routes (similar configuration as that in FIG. 1).

Figure 23:
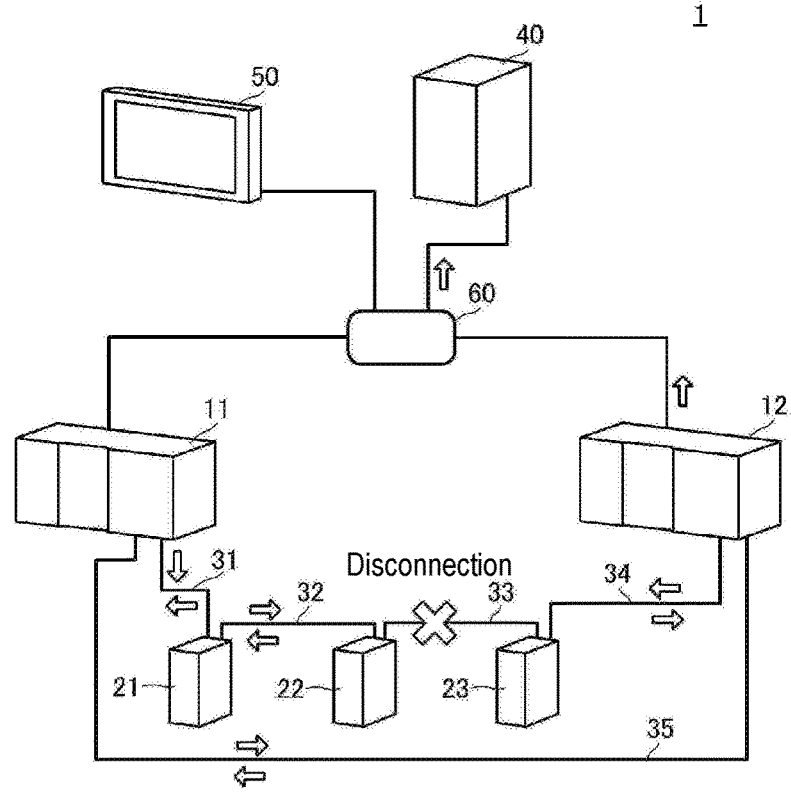
FIG. 23 is a diagram showing an example of a case that can be dealt with by redundancy of a cable.

FIG. 23 is a diagram showing an example of a case that can be dealt with by redundancy of a cable. FIG. 23 shows a case where the communication cable 33 connecting the slave device 22 and the slave device 23 to each other is disconnected. In FIG. 15, a white bold arrow indicates a transmission state of a control frame.

As shown in FIG. 23, the control system 1 includes a first route and a second route. In the first route, the plurality of slave devices 21, 22, and 23 is connected in order between the controller 11 and the controller 12 using the plurality of communication cables 31, 32, 33, and 34. In the second route, the controller 11 and the controller 12 are directly connected to each other through the communication cable 35. In general, the controller 11 transmits a control frame through the first route.

Here, in a case where the communication cable 33 is disconnected, the control frame transmitted from the controller 11 is looped back by the slave device 22. The controller 11 confirms PDO or a time stamp of the control frame. When it is detected that the control frame has not passed through the slave device 23, the controller 11 loops back the control frame to the second route. The control frame reaches the slave device 23 through the second route and the controller 12. When the slave device 22 side is viewed from the slave device 23, the slave device 22 is not connected, and thus the slave device 23 loops back the control frame to the controller 12 side. The controller 12 loops back the control frame to the controller 11 through the second route.

(Specific Process of Controller in Run Mode)

Figure 24:
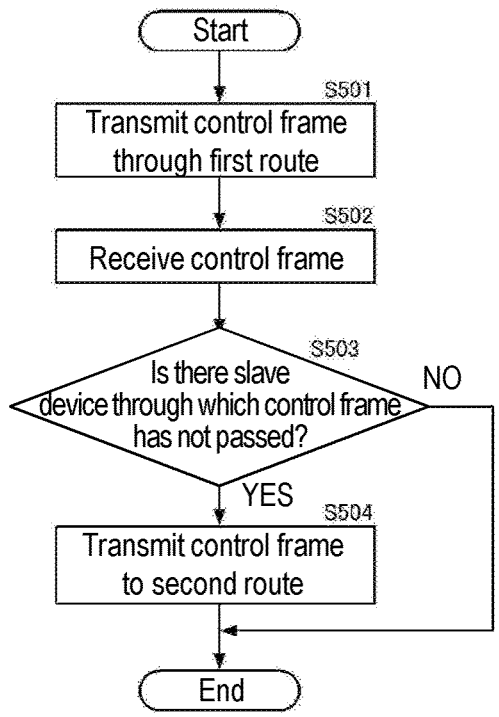
FIG. 24 is a flowchart of a process of the controller in a run mode corresponding to redundancy of a cable.

The controller 11 in a run mode specifically executes the following process. FIG. 24 is a flowchart of a process of the controller in a run mode corresponding to redundancy of a cable.

The controller 11 in a run mode transmits a control frame through the first route (a route in which the plurality of slave devices 21, 22, and 23 is connected between the controller 11 and the controller 12) (S501). The controller 11 receives the control frame (S502).

The controller 11 analyzes the control frame and detects whether or not there is a slave device through which the control frame has not passed. For example, the controller 11 detects whether or not there is a slave device through which the control frame has not passed, based on the presence or absence of a time stamp in each slave device and consistency.

When there is no slave device through which the control frame has not passed (S503: NO), the controller 11 continues general control, that is, control for transmitting the control frame from the first route.

When there is a slave device through which the control frame has not passed (S503: YES), the controller 11 loops back the control frame to the second route and transfers the control frame (S504).

(Specific Process of Controller in Data Acquisition Mode)

Figure 25:
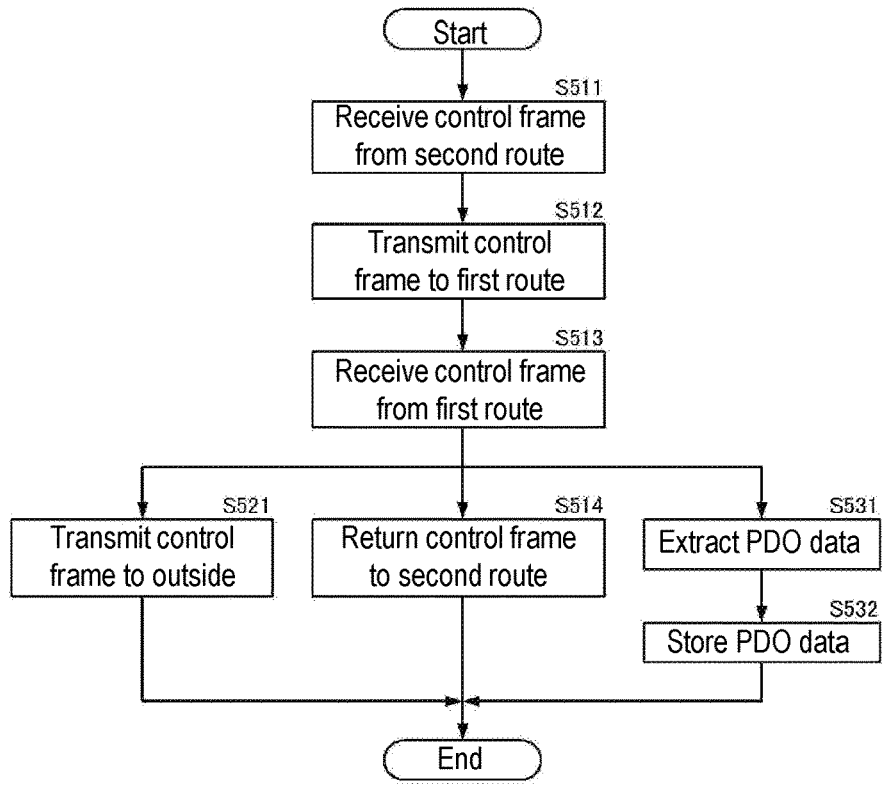
FIG. 25 is a flowchart of a process of the controller in a data acquisition mode corresponding to redundancy of a cable.

The controller 12 in a data acquisition mode specifically executes the following process. FIG. 25 is a flowchart of a process of the controller in a data acquisition mode corresponding to redundancy of a cable.

The controller 12 in a data acquisition mode cannot receive a control frame from the first route and receives a control frame from the second route (S511). The controller 12 loops back the control frame to the first route and transmits the control frame (S512). The controller 12 receives the control frame from the first route (S513).

The controller 12 loops back the control frame to the second route and transmits the control frame (S514).

In addition, the controller 12 transmits the control frame to the database device 40 of the information communication network 60 (S511). The controller 12 extracts PDO data from the control frame (S531) and stores the extracted PDO data in the shared memory 104' (S532).

With the above-described configuration and process, the controller 11 can transmit control frames to all of the plurality of slave devices 21, 22, and 23 and receive control frames updated in all of the plurality of slave devices 21, 22, and 23 even when disconnection or the like occurs in the middle of the first route. That is, even when disconnection occurs in the middle of the first route, the controller 11 continues the control of the plurality of slave devices 21, 22, and 23. This is not dependent on the location of disconnection, and naturally, the controller 11 continues the control of the plurality of slave devices 21, 22, and 23 even when disconnection occurs in the middle of the second route, that is, the communication cable 35.

(Abnormality Detection by Controller in Data Acquisition Mode)

In the above-described configuration, a mode in which an abnormality detection process is executed by the database device 40 connected to the information communication network 60 has been described. However, an abnormality detection process may be performed by the controller in a data acquisition mode.

Figure 26:
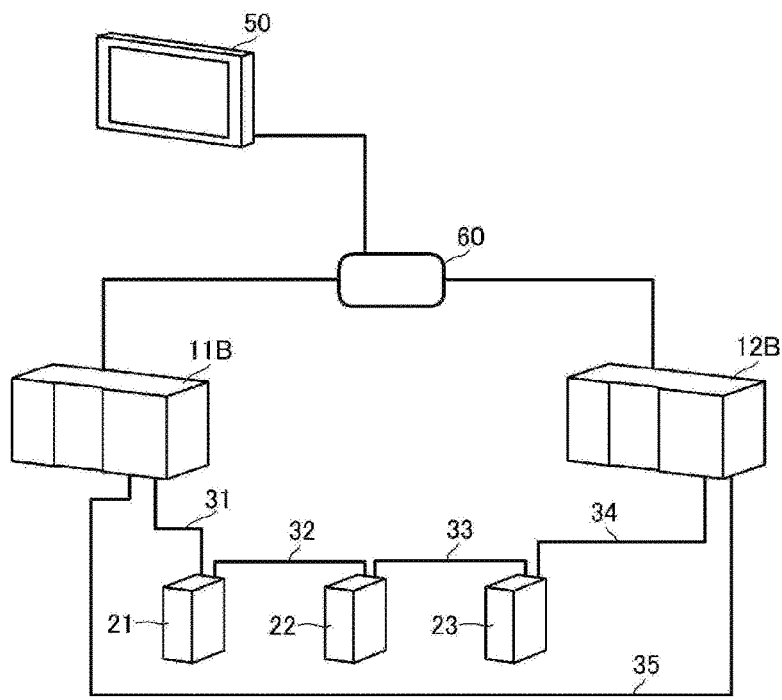
FIG. 26 is a diagram showing a configuration of a device in the control system in a case where abnormality detection is executed by a controller in a data acquisition mode.
Figure 27:
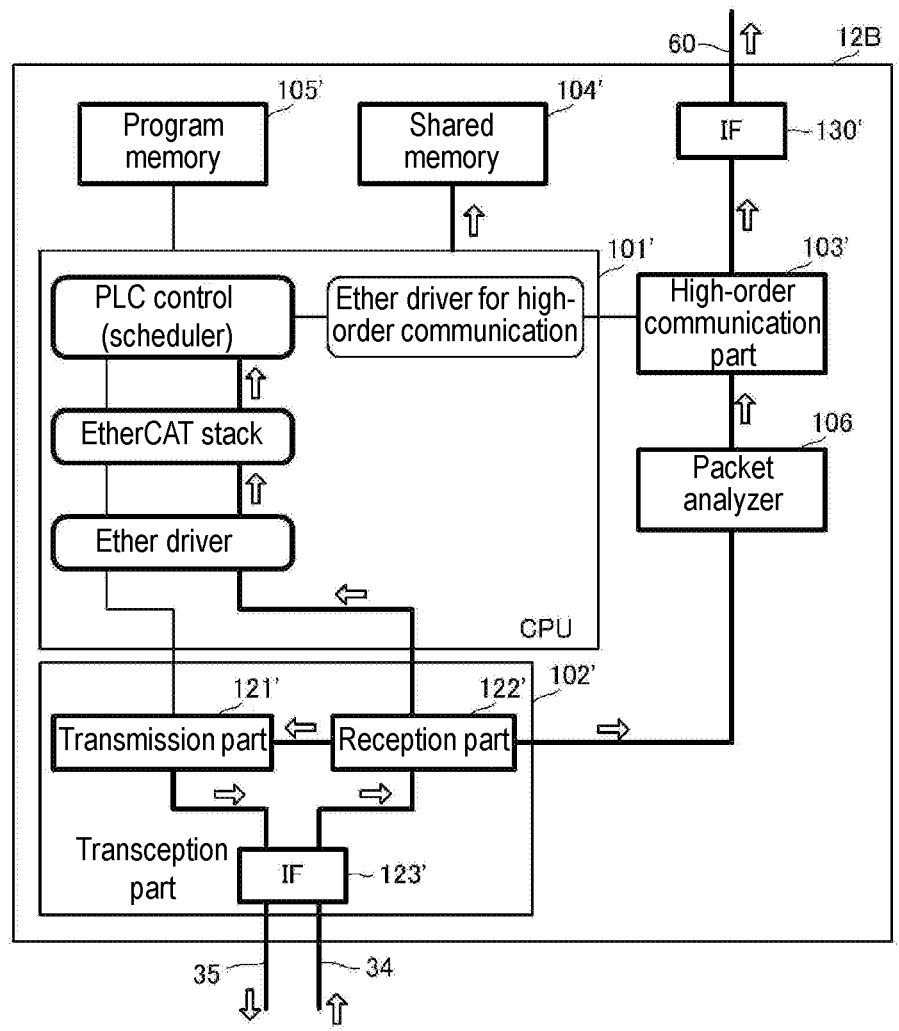
FIG. 27 is a block diagram showing a configuration related to data communication in a controller in a data acquisition mode.

FIG. 26 is a diagram showing a configuration of a device in a control system in a case where abnormality detection is executed by a controller in a data acquisition mode. FIG. 27 is a block diagram showing a configuration related to data communication in a controller in a data acquisition mode.

A control system 1B shown in FIG. 26 is different from the control system 1 shown in FIG. 1 in that a controller 11B is used instead of the controller 11, a controller 12B is used instead of the controller 12, and the database device 40 is not an essential component. Other components of the control system 1B are the same as those of the control system 1, and description of the same parts will be omitted.

The controller 11B and the controller 12B have the same configuration, and are different from the controller 11 and the controller 12 in that a packet analyzer 106 as shown in FIG. 27 is added. The controller 11B and the controller 12B operate in different modes. For example, when the controller 11B is operating in the above-described run mode, the controller 12B is operating in the above-described data acquisition mode.

Further, the controller 12B executes a process related to abnormality detection executed by the above-described database device 40 is executed by the packet analyzer 106. Since the controller 12B is operating in a data acquisition mode, control of the control network is not affected even when abnormality detection is performed. Therefore, the control system 1B can execute abnormality detection using only a device connected to the control network while reliably executing control of the plurality of slave devices 21, 22, and 23. Meanwhile, in this case, the controller 12B may output a result of the abnormality detection to the information communication network 60. For example, the controller 12B outputs the result of the abnormality detection to the UI device 50 through the information communication network 60. The UI device 50 or an operator operating the UI device 50 determines a command and the like for the controller 11B based on the result of the abnormality detection.

In addition, it is preferable that the packet analyzer 106 be realized by a dedicated IC different from the CPU 101', for example, an ASIC. Thereby, a processing load on the CPU 101' of the controller 12B in a data acquisition mode can be reduced.

Further, in this case, it is preferable that the transception part 102' transmit a control frame to the packet analyzer 106 through DMA transmission. Thereby, a load of the CPU 101' is further reduced.

Meanwhile, in the configurations shown in FIGS. 26 and 27, a mode in which both the controller 11B and the controller 12B have the same configuration has been described, but the packet analyzer 106 may be included in only the controller 12B.

What is claimed is:

1. A control system comprising:
a field bus to which slave devices are linearly connected through a communication cable;
a first controller which is connected to one end of the field bus;
a second controller which is connected to the other end of the field bus; and
a data communication network that connects the first controller and the second controller without going through the slave devices,
wherein each of the first controller and the second controller includes
a control frame generation part which generates a control frame to be provided to the slave devices, and
a transception part which transmits and receives the control frame to and from the slave devices, and
one of the first controller and the second controller generates the control frame by the control frame generation part, transmits the generated control frame from the transception part, and the other one performs loopback communication of the control frame by the transception part,
when the first controller generates and transmits the control frame and the second controller performs the loopback communication of the control frame, the second controller transmits an operation confirmation signal to the first controller through the data communication network, and starts generation and transmission of the control frame when a response signal to the operation confirmation signal is not able to be received.

2. The control system according to claim 1, wherein the second controller observes the control frame and starts generation and transmission of the control frame when the control frame is not able to be received over a predetermined period of time.

3. The control system according to claim 2, further comprising:
a user interface device which is connected to the data communication network and receives an operation input of switching of control between the first controller and the second controller,
wherein when the first controller generates and transmits the control frame and the second controller performs loopback communication of the control frame, the first controller stops generation and transmission of the control frame and starts the loopback communication of the control frame when receiving a command for the switching of the control from the user interface device, and the second controller stops the loopback communication of the control frame when receiving a command for the switching of the control from the user interface device and starts the generation and the transmission of the control frame.

4. The control system according to claim 2, wherein the control frame generation part and the transception part are formed of different semiconductor devices.

5. The control system according to claim 4, wherein
the control frame generation part is constituted by a computation element that executes a generation program for the control frame, and
the transception part is constituted by a semiconductor element that exclusively performs transmission and reception of the control frame.

6. The control system according to claim 1, further comprising:
a user interface device which is connected to the data communication network and receives an operation input of switching of control between the first controller and the second controller,
wherein when the first controller generates and transmits the control frame and the second controller performs loopback communication of the control frame, the first controller stops generation and transmission of the control frame and starts the loopback communication of the control frame when receiving a command for the switching of the control from the user interface device, and the second controller stops the loopback communication of the control frame when receiving a command for the switching of the control from the user interface device and starts the generation and the transmission of the control frame.

7. The control system according to claim 6, wherein after the first controller and the second controller transmit and receive a switching confirmation signal and mutually confirm the switching, the first controller stops the generation and the transmission of the control frame and starts the loopback communication of the control frame, and the second controller stops the loopback communication of the control frame and starts the generation and the transmission of the control frame.

8. The control system according to claim 6, wherein the control fame generation part and the transception part are formed of different semiconductor devices.

9. The control system according to claim 8, wherein
the control frame generation part is constituted by a computation element that executes a generation program for the control frame, and
the transception part is constituted by a semiconductor element that exclusively performs transmission and reception of the control frame.

10. The control system according to claim 1, wherein the control frame generation part and the transception part are formed of different semiconductor devices.

11. The control system according to claim 10, wherein
the control frame generation part is constituted by a computation element that executes a generation program for the control frame, and
the transception part is constituted by a semiconductor element that exclusively performs transmission and reception of the control frame.

12. The control system according to claim 7, wherein the control frame generation part and the transception part are formed of different semiconductor devices.

13. The control system according to claim 12, wherein
the control frame generation part is constituted by a computation element that executes a generation program for the control frame, and
the transception part is constituted by a semiconductor element that exclusively performs transmission and reception of the control frame.

14. A control method comprising:
connecting a first controller to one end of a field bus to which slave devices are linearly connected through a communication cable;
connecting a second controller to the other end of the field bus;
connecting the first controller and the second controller by a data communication network without going through the slave devices, the first controller generates a control frame that is provided to the slave devices, and transmits the control frame to the slave devices, and the second controller transmits an operation confirmation signal to the first controller through the data communication network while performing loopback communication of the control frame, and generates and transmits the control frame to the slave devices when a response signal to the operation confirmation signal is not able to be received.

15. A control system comprising:

a field bus to which slave devices are linearly connected through a communication cable;

a first controller which is connected to one end of the field bus;

a second controller which is connected to the other end of the field bus;

a data communication network that connects the first controller and the second controller without going through the slave devices; and a user interface device which is connected to the data communication network and receives an operation input of switching of control between the first controller and the second controller, wherein each of the first controller and the second controller includes a control frame generation part which generates a control frame to be provided to the slave devices, and a transception part which transmits and receives the control frame to and from the slave devices, and one of the first controller and the second controller generates the control frame by the control frame generation part, transmits the generated control frame from the transception part, and the other one performs loopback communication of the control frame by the transception part, and when the first controller generates and transmits the control frame and the second controller performs loopback communication of the control frame, the first controller stops generation and transmission of the control frame and starts the loopback communication of the control frame when receiving a command for the switching of the control from the user interface device, and the second controller stops the loopback communication of the control frame and starts the generation and the transmission of the control frame when receiving a command for the switching of the control from the user interface device.

\* \* \* \* \*